(12) United States Patent
Yang et al.

(10) Patent No.: US 10,091,531 B2
(45) Date of Patent: *Oct. 2, 2018

(54) IMAGE CODING AND DECODING METHODS AND APPARATUSES

(71) Applicant: Huawei Technologies Co., Ltd., Shenzhen, Guangdong (CN)

(72) Inventors: Haitao Yang, Shenzhen (CN); Jiantong Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/492,868

(22) Filed: Apr. 20, 2017

(65) Prior Publication Data

US 2017/0223381 A1 Aug. 3, 2017

Related U.S. Application Data

(63) Continuation of application No. 14/268,115, filed on May 2, 2014, now Pat. No. 9,667,958, which is a
(Continued)

(30) Foreign Application Priority Data

Nov. 4, 2011 (CN) .......................... 2011 1 0345953

(51) Int. Cl.
*H04N 19/61* (2014.01)
*H04N 19/176* (2014.01)
(Continued)

(52) U.S. Cl.
CPC .......... *H04N 19/61* (2014.11); *H04N 19/126* (2014.11); *H04N 19/136* (2014.11);
(Continued)

(58) Field of Classification Search
CPC combination set(s) only.
See application file for complete search history.

(56) References Cited

U.S. PATENT DOCUMENTS 5,682,152 A * 10/1997 Wang ...................... H03M 7/46
                                                      341/50
8,315,204 B2 * 11/2012 Zhu ......................... H04L 12/66
                                                      370/328
(Continued)

FOREIGN PATENT DOCUMENTS

CN     101039421         9/2007
CN     101194510 A       6/2008
(Continued)

OTHER PUBLICATIONS

"Series H: Audiovisual and Multimedia Systems; Infrastructure of audiovisual services—Coding of moving video; Advanced video coding for generic audiovisual services", ITU-T H.264, Mar. 2010, 669 pages.

*Primary Examiner* — Janese Duley

(57) ABSTRACT

An embodiment of the present invention provides an image coding method, where the coding method includes: performing predictive coding on an image; performing transform coding on the image on which the predictive coding has been performed; performing, by using a quantization matrix, quantization coding on the image on which the transform coding has been performed, where the quantization matrix is a matrix reflecting image quantization step information, the quantization matrix includes an M*N quantization matrix and an N*M quantization matrix, and the N*M quantization matrix is obtained by transposing the M*N quantization matrix; and performing entropy coding on the image on which the quantization coding has been performed, and coding the M*N quantization matrix, so as to generate a code stream. In the present invention, the number of bits
(Continued)

required for coding a quantization matrix is effectively saved, thereby improving compression efficiency.

2 Claims, 4 Drawing Sheets

Related U.S. Application Data continuation of application No. PCT/CN2012/084062, filed on Nov. 5, 2012.

(51) Int. Cl.
*H04N 19/463* (2014.01)
*H04N 19/126* (2014.01)
*H04N 19/136* (2014.01)
*H04N 19/91* (2014.01)

(52) U.S. Cl.
CPC ......... *H04N 19/176* (2014.11); *H04N 19/463* (2014.11); *H04N 19/91* (2014.11)

(56) References Cited

U.S. PATENT DOCUMENTS

| | | | |
|---|---|---|---|
| 2004/0047512 A1* | 3/2004 | Handley | H04N 19/122 |
| | | | 382/250 |
| 2007/0258518 A1 | 11/2007 | Tu et al. | |
| 2009/0034612 A1 | 2/2009 | Zheng et al. | |
| 2009/0147843 A1 | 6/2009 | Han et al. | |
| 2012/0140815 A1* | 6/2012 | Zhou | H04N 19/117 |
| | | | 375/240.03 |
| 2012/0201297 A1 | 8/2012 | Lim et al. | |
| 2013/0003824 A1* | 1/2013 | Guo | H04N 19/176 |
| | | | 375/240.03 |

FOREIGN PATENT DOCUMENTS

| | | |
|---|---|---|
| CN | 101438591 A | 5/2009 |
| CN | 101946513 A | 1/2011 |
| WO | WO 2011/052217 A1 | 5/2011 |
| WO | WO 2013/008458 A1 | 1/2013 |

* cited by examiner

IMAGE CODING AND DECODING METHODS AND APPARATUSES

CROSS-REFERENCE TO RELATED APPLICATIONS

This application is a continuation of U.S. application Ser. No. 14/268,115, filed on May 2, 2014, which is a continuation of International Application No. PCT/CN2012/084062, filed on Nov. 5, 2012, which claims priority to Chinese Patent Application No. 201110345953.8, filed on Nov. 4, 2011. All of the afore-mentioned patent applications are hereby incorporated by reference in their entireties.

TECHNICAL FIELD

The present invention relates to the field of communications, and in particular, to image coding and decoding methods and apparatuses.

BACKGROUND

Because of a huge amount of video data, in an actual application, video data usually needs to be compressed and coded. A coder processes the video data through prediction, transform, quantization, and entropy coding processes, so as to implement data compression to generate a video stream. The video stream may be used for storage or network transmission. A decoder performs a decoding operation on the video stream through entropy decoding, inverse quantization, inverse transform, and predictive compensation, so as to reconstruct the video data.

In an H.264 coding technology, accurate control of a signal compression artifact is implemented by using a quantization matrix (quantization matrix, QM). A coder provides a group of QMs suitable for a currently-to-be-coded image according to content of the current image, and then writes code of the QMs into a code stream. After a decoder receives the code stream carrying QM information, the decoder obtains the QM information through decoding, and obtains the image through decoding by using the QM information. In H.264, each frame of image may have a maximum of eight groups of QM matrices QMi, where i=1, 2, . . . 8. The eight groups of QM matrices indicate six QMs in 4*4 transform: luminance Y, chrominance Cb, and chrominance Cr of intraframe prediction, and luminance Y, chrominance Cb, and chrominance Cr of interframe prediction, and two QMs in 8*8 transform: luminance Y of intraframe prediction and interframe prediction. Because a data amount of the QM info nation is large, the QM information needs to be compressed and coded, so as to reduce the number of bits used for representing the QM information. In H.264, six 4*4 quantization matrices and two 8*8 quantization matrices are separately coded by using the following compression method. Specific steps are as follows:

First step: Perform a scanning operation on a two-dimensional quantization matrix to generate one-dimensional data;

Second step: Perform DPCM coding on the one-dimensional data; and

Third step: Perform entropy coding on the coded data and write the data on which the entropy coding has been performed into a code stream.

In the foregoing solution, both transform and quantization use N*N square matrices, and when non-square transform and quantization matrices are used, for an N*M quantization matrix, many bits are required to represent the quantization matrices according to the foregoing quantization matrix compression method; and when an applied bandwidth is quite small, bits used for transmitting the quantization matrices severely affect the quality of a coded image.

SUMMARY

Embodiments of the present invention provide image coding and decoding methods and apparatuses, so as to decrease a transmission bandwidth of a code stream.

An embodiment of the present invention provides an image coding method, where the coding method includes: performing predictive coding on an image; performing transform coding on the image on which the predictive coding has been performed; performing, by using a quantization matrix, quantization coding on the image on which the transform coding has been performed, where the quantization matrix is a matrix reflecting image quantization step information, the quantization matrix includes an M*N quantization matrix and an N*M quantization matrix, and the N*M quantization matrix is obtained by transposing the M*N quantization matrix; and performing entropy coding on the image on which the quantization coding has been performed, and coding the M*N quantization matrix, so as to generate a code stream.

An embodiment of the present invention provides an image decoding method, where the decoding method includes: performing entropy decoding on a received code stream to obtain image data and a quantization matrix, where the quantization matrix is a matrix reflecting image quantization step information, and the quantization matrix includes an M*N quantization matrix; obtaining an N*M quantization matrix by transposing the M*N quantization matrix; performing, by using the M*N quantization matrix and the N*M quantization matrix, inverse quantization on the image data; performing inverse transform on the image data on which the inverse quantization has been performed; and performing predictive compensation on the image data on which the inverse transform has been performed, so as to generate a decoded image.

An embodiment of the present invention provides an image coding apparatus, where the coding apparatus includes: a predictive coding module, configured to perform predictive coding on an image; a transform coding module, configured to perform transform coding on the image on which the predictive coding has been performed; a quantization coding module, configured to perform, by using a quantization matrix, quantization coding on the image on which the transform coding has been performed, where the quantization matrix is a matrix reflecting image quantization step information, the quantization matrix includes an M*N quantization matrix and an N*M quantization matrix, and the N*M quantization matrix is obtained by transposing the M*N quantization matrix; and an entropy coding module, configured to perform entropy coding on the image on which the quantization coding has been performed, and code the M*N quantization matrix, so as to generate a code stream.

An embodiment of the present invention provides an image decoding apparatus, where the decoding apparatus includes: an entropy decoding unit, configured to perform entropy decoding on a received code stream to obtain image data and a quantization matrix, where the quantization matrix is a matrix reflecting image quantization step information, and the quantization matrix includes an M*N quantization matrix; an inverse quantization unit, configured to obtain an N*M quantization matrix by transposing the M*N quantization matrix, and perform, by using the M*N quantization matrix and the N*M quantization matrix, inverse quantization on the image data; an inverse transform unit, configured to perform inverse transform on the image data on which the inverse quantization has been performed; and a predictive compensation unit, configured to perform predictive compensation on the image data on which the inverse transform has been performed, so as to generate a decoded image.

In the embodiments of the present invention, the number of bits required for coding a quantization matrix is effectively saved, thereby improving compression efficiency.

BRIEF DESCRIPTION OF THE DRAWINGS

To describe the technical solutions in the embodiments of the present invention or in the prior art more clearly, the accompanying drawings required for describing the embodiments are introduced briefly in the following. Apparently, the accompanying drawings in the following description show some embodiments of the present invention, and a person of ordinary skill in the art can derive other drawings from these accompanying drawings without creative efforts.

DETAILED DESCRIPTION

In order to make the objectives, technical solutions, and advantages of the present invention more comprehensible, the technical solutions in the embodiments of the present invention are clearly described in the following with reference to the accompanying drawings in the embodiments of the present invention. Apparently, the embodiments to be described are a part rather than all of the embodiments of the present invention. All other embodiments obtained by a person of ordinary skill in the art based on the embodiments of the present invention without creative efforts shall fall within the protection scope of the present invention.

Figure 1:
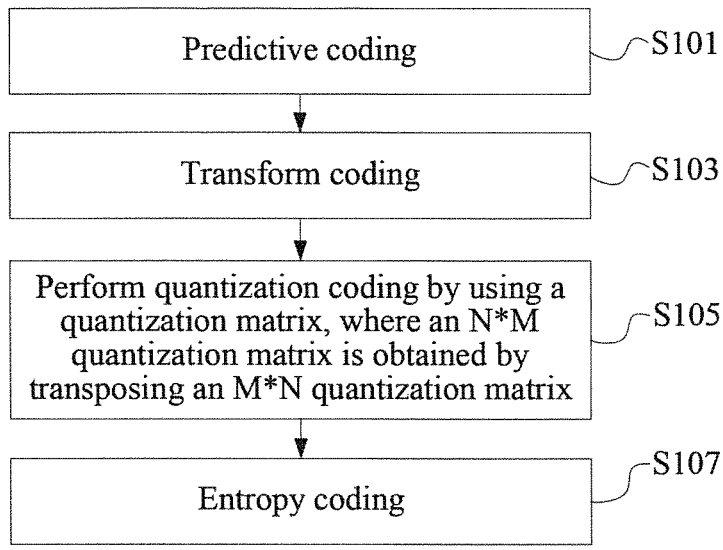
FIG. 1 is a flowchart of an image coding method according to an embodiment of the present invention.

An embodiment of the present invention provides an image coding method. Referring to FIG. 1, FIG. 1 is a flowchart of this method according to an embodiment. The coding method includes:

S101: Perform predictive coding on an image.

S103: Perform transform coding on the image on which the predictive coding has been performed.

S105: Perform, by using a quantization matrix, quantization coding on the image on which the transform coding has been performed, where the quantization matrix is a matrix reflecting image quantization step information, the quantization matrix includes an M*N quantization matrix and an N*M quantization matrix, and the N*M quantization matrix is obtained by transposing the M*N quantization matrix.

S107: Perform entropy coding on the image on which the quantization coding has been performed, and code the M*N quantization matrix, so as to generate a code stream.

In an image coding and decoding process, each frame of image is segmented into small image blocks for coding or decoding processing, for example, a frame of image is segmented into image blocks with a size of N×N.

In an embodiment of the present invention, S101 specifically includes: when an N×N image block is coded, performing predictive coding on the N×N image according to a different subblock. For a flat image area, the area is divided by using a large image subblock, so as to save description information used for describing an image division relationship; for an image area with many details, the area is divided by using a small image subblock, so as to improve predictive accuracy during image coding; and compression efficiency is improved through self-adaption division. According to different predictive relationships, predictive coding includes intraframe coding and interframe coding. The intraframe coding is to predict a currently-to-be-coded block by using a spatially adjacent reconstructed pixel from a same frame of image. The interframe prediction is to predict a currently-to-be-coded block by using a pixel of an image preceding or following an image where the currently-to-be-coded block is located.

In an embodiment of the present invention, S103 specifically includes: during the transform coding, performing the transform coding on data on which predictive coding has been performed, so as to concentrate data energy and reduce the number of bits used for describing the data. Transform coding technologies include DCT, DST, wavelet transform, and the like. For a different subblock size, a different transform matrix is used to perform transform coding. By using DCT transform as an example, for a 4×4 subblock, 4×4 DCT transform is performed; for an 8×8 subblock, 8×8 DCT transform is performed; and for a 32×32 subblock, 32×32 DOT transform is performed, or 4×4 or 8×8 transform may be performed, or non-square transform is performed, such as 32×8 transform or 16×4 transform. Non-square transform has advantages of being capable of better adapting to content of an image and improving coding efficiency.

In an embodiment of the present invention, S105 specifically includes: when a segment of video signals is coded, selecting, according to different image content, a transform matrix suitable for the image content, performing, by using a quantization matrix, quantization coding on the image on which transform coding has been performed, and coding image data information and the transform matrix and writing the coded image data information and transform matrix into a code stream, so as to control compression efficiency of video data. The quantization matrix includes an M*N quantization matrix and an N*M quantization matrix, and the N*M quantization matrix is obtained by transposing the M*N quantization matrix.

Further, in another embodiment of the present invention, the N*M quantization matrix is a transposed matrix of the M*N quantization matrix.

In an invention implementation solution with four coexisting quantization matrices: 8*8, 8*4, 4*8, and 4*4 quantization matrices, first a coder selects, according to image content, a quantization matrix QMi suitable for the current image content, where i=1, 2, . . . , 12, QM1 to QM6 are quantization matrices of components Y, Cb and Cr during interframe and intraframe predictive coding of a 4*4 transform matrix, QM7 to QM10 are quantization matrices of a component Y during interframe and intraframe predictive coding of an 8*4 transform matrix and a 4*8 transform matrix, and QM11 to QM12 are quantization matrices of a component Y during interframe and intraframe predictive coding of an 8*8 transform matrix. QM7 and QM9 are in a transposition relationship, and QM8 and QM10 are in a transposition relationship. Then, a transformed image of the current image is quantized and coded by using the quantization matrices, and the quantized and coded image is written into a code stream. Meanwhile, the quantization matrices are coded. When the quantization matrices are coded, only QM1 to 8 and QM11 to 12 are coded, and QM9 and 10 are not coded. Information of QM9 and 10 is obtained after a decoding end transposes information of QM7 and 8.

In another embodiment of the present invention, that the N*M quantization matrix is obtained by transposing the M*N quantization matrix includes: calculating an N*M differential quantization matrix according to a difference between the N*M quantization matrix and a transposed matrix of the M*N quantization matrix; and the coding the M*N quantization matrix includes: performing entropy coding on the image on which the quantization coding has been performed, the M*N quantization matrix, and the N*M differential quantization matrix.

In an embodiment of the present invention, S107 specifically includes: coding each quantization matrix according to the following method:

performing a scanning operation on a two-dimensional quantization matrix to generate one-dimensional data;

performing DPCM prediction on the one-dimensional data to generate predicted differential data; and performing entropy coding on the predicted differential data, and writing the predicted differential data on which the entropy coding has been performed into a code stream.

In another embodiment of the present invention, S107 specifically includes: coding each quantization matrix according to the following method:

coding an M*N quantization matrix $QM_{M \times N}$ by using the following method:

performing predictive coding on the current $QM_{M \times N}$, where a predictive signal of the $QM_{M \times N}$ is a signal obtained by transposing the $QM_{N \times M}$, so as to obtain a predicated quantization matrix difference signal $DQM_{M \times N}$;

performing quantization processing and scanning on the $DQM_{M \times N}$ to obtain a one-dimensional coefficient; and performing entropy coding on the one-dimensional coefficient, and writing the one-dimensional coefficient on which the entropy coding has been performed into a code stream.

Figure 2:
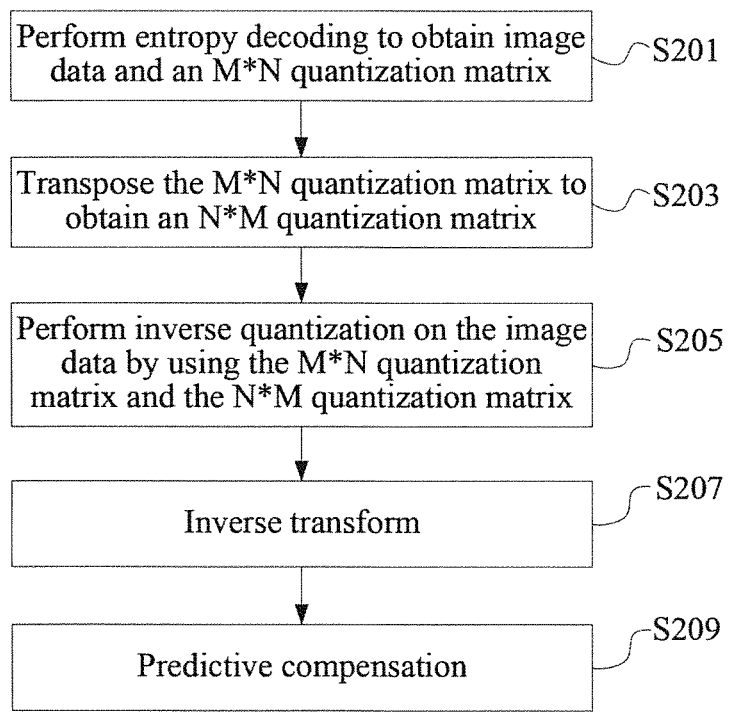
FIG. 2 is a flowchart of an image decoding method according to an embodiment of the present invention.

An embodiment of the present invention provides an image decoding method. Referring to FIG. 2, FIG. 2 is a flowchart of this method according to an embodiment. The decoding method includes:

S201: Perform entropy decoding on a received code stream to obtain image data and a quantization matrix, where the quantization matrix is a matrix reflecting image quantization step information, and the quantization matrix includes an M*N quantization matrix.

S203: Obtain an N*M quantization matrix by transposing the M*N quantization matrix.

S205: Perform, by using the M*N quantization matrix and the N*M quantization matrix, inverse quantization on the image data on which the entropy decoding has been performed.

S207: Perform inverse transform on the image data on which the inverse quantization has been performed.

S209: Perform predictive compensation on the image data on which the inverse transform has been performed, so as to generate a decoded image.

In an embodiment of the present invention, a process of S201: perform entropy decoding on a received code stream to obtain a quantization matrix includes:

performing entropy decoding on a code stream of the quantization matrix to obtain a one-dimensional predicted quantization coefficient difference signal;

performing DPCM predictive compensation on the one-dimensional quantization coefficient difference signal; and performing inverse scanning to obtain a two-dimensional quantization matrix.

In another embodiment of the present invention, a process of S201: perform entropy decoding on a received code stream to obtain a quantization matrix includes:

performing entropy decoding on a code stream of a $QM_{M \times N}$ to obtain a one-dimensional coefficient;

performing inverse scanning on the one-dimensional coefficient to obtain a two-dimensional coefficient matrix;

performing inverse quantization on the two-dimensional coefficient matrix to obtain a reconstructed value of a difference signal $DQM_{M \times N}$; and using a transposition signal of a $QM_{N \times M}$ signal as a predictive value, where the $QM_{N \times M}$ signal is obtained through decoding, and performing predictive compensation on a $DQM_{M \times N}$ by using the predictive value, so as to obtain a reconstructed $QM_{M \times N}$ signal and complete a decoding process of the $QM_{M \times N}$.

In an embodiment of the present invention, S203: obtain an N*M quantization matrix by transposing the M*N quantization matrix, which includes that: the N*M quantization matrix is a transposed matrix of the M*N quantization matrix.

In another embodiment of the present invention, S201: perform entropy decoding on a received code stream to obtain image data and a quantization matrix, which includes: performing entropy decoding on the received code stream to obtain the image data, the quantization matrix, and an M*N differential quantization matrix; and S203: obtain an N*M quantization matrix by transposing the M*N quantization matrix, which includes: obtaining the N*M quantization matrix by using a sum of a transposed matrix of the M*N quantization matrix and the N*M differential quantization matrix.

In another embodiment of the present invention, if a coding end generates four quantization matrices: 8*8, 8*4, 4*8, and 4*4 quantization matrices, a coder selects, according to image content, a quantization matrix QMi suitable for the current image content, where i=1, 2, . . . , 12. When the quantization matrices are coded, only QM1 to QM8 and QM11 to QM12 are coded. In S201, entropy decoding is performed on the received code stream, and obtained quantization matrices include QM1 to QM8 and QM11 to QM12; and S203 includes: obtaining QM9 and QM10 by transposing decoded QM7 and QM8.

Figure 3:
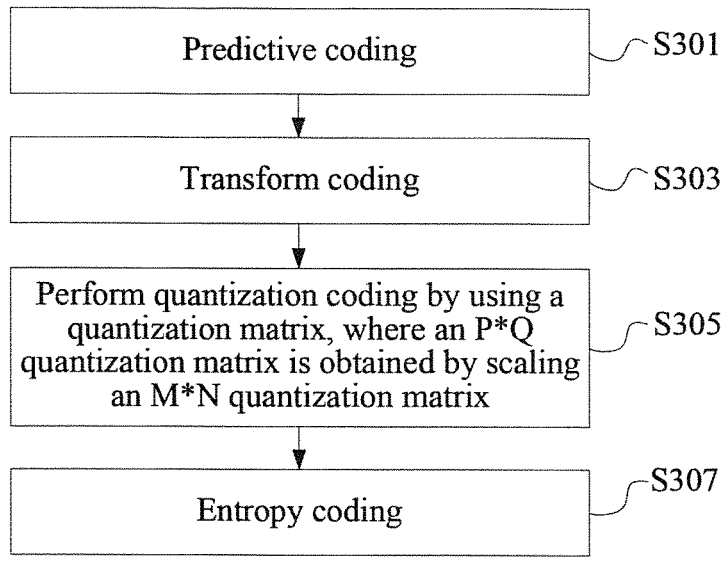
FIG. 3 is a flowchart of an image coding method according to another embodiment of the present invention.

An embodiment of the present invention further provides an image coding method. Referring to FIG. 3, FIG. 3 is a flowchart of this method according to an embodiment. This method includes:

S301: Perform predictive coding on an image.

S303: Perform transform coding on the image on which the predictive coding has been performed.

S305: Perform, by using a quantization matrix, quantization coding on the image on which the transform coding has been performed, where the quantization matrix is a matrix reflecting image quantization step information, the quantization matrix includes an M*N quantization matrix and a P*Q quantization matrix, and the P*Q quantization matrix is obtained by scaling the M*N quantization matrix.

S307: Perform entropy coding on the image on which the quantization coding has been performed, and code the M*N quantization matrix, so as to generate a code stream.

In the embodiment of the present invention, M is not equal to N, and P is not equal to Q.

In an embodiment of the present invention, in S305, the P*Q quantization matrix is obtained by scaling the M*N quantization matrix, which includes that: the P*Q quantization matrix is a scaled matrix of the M*N quantization matrix.

In another embodiment of the present invention, in S305, the P*Q quantization matrix is obtained by scaling the M*N quantization matrix, which includes that: the P*Q quantization matrix is obtained by predicting a scaled matrix of the M*N quantization matrix; and the coding the M*N quantization matrix includes: obtaining a P*Q differential quantization matrix through calculation according to a difference between the P*Q quantization matrix and the scaled matrix of the M*N quantization matrix, and coding the M*N quantization matrix and the P*Q differential quantization matrix.

If P is less than M or Q is less than N, the P*Q quantization matrix is obtained by performing downsampling interpolation or linear interpolation on the scaled matrix of the M*N quantization matrix or by selecting a coefficient at a same interval from the matrix.

If P is greater than M or Q is greater than N, the P*Q quantization matrix is obtained by magnifying the M*N quantization matrix.

In an embodiment of the present invention, if a coding end generates four quantization matrices: 8*8, 8*4, 4*8, and 4*4 quantization matrices, the 8*4 and 4*8 quantization matrices may not be transmitted, and the 8*4 and 4*8 quantization matrices are derived from the 8*8 quantization matrix.

Figure 4:
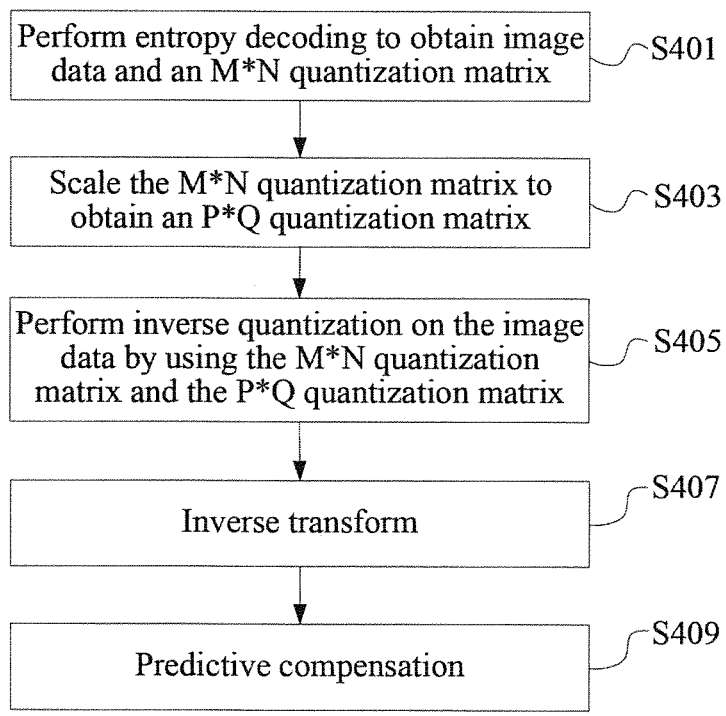
FIG. 4 is a flowchart of an image decoding method according to another embodiment of the present invention.

The present invention provides an image decoding method. Referring to FIG. 4, FIG. 4 is a flowchart of this method according to an embodiment. The decoding method includes:

S401: Perform entropy decoding on a received code stream to obtain image data and a quantization matrix, where the quantization matrix is a matrix reflecting image quantization step information, and the quantization matrix includes an M*N quantization matrix.

S403: Obtain a P*Q quantization matrix by scaling the M*N quantization matrix.

S405: Perform, by using the M*N quantization matrix and the P*Q quantization matrix, inverse quantization on the image data on which the entropy decoding has been performed.

S407: Perform inverse transform on the image data on which the inverse quantization has been performed.

S409: Perform predictive compensation on the image data on which the inverse transform has been performed, so as to generate a decoded image.

In an embodiment of the present invention, S403: obtain a P*Q quantization matrix by scaling the M*N quantization matrix, which includes that: the P*Q quantization matrix is a scaled matrix of the M*N quantization matrix.

In the embodiment of the present invention, M is not equal to N, and P is not equal to Q.

In another embodiment of the present invention, S401: perform entropy decoding on a received code stream to obtain image data and a quantization matrix, which includes: performing the entropy decoding on the received code stream to obtain the image data, the quantization matrix, and an M*N differential quantization matrix; and S403: obtain a P*Q quantization matrix by scaling the M*N quantization matrix, which includes: obtaining the P*Q quantization matrix by using a sum of a scaled matrix of the M*N quantization matrix and the M*N differential quantization matrix.

Figure 5:
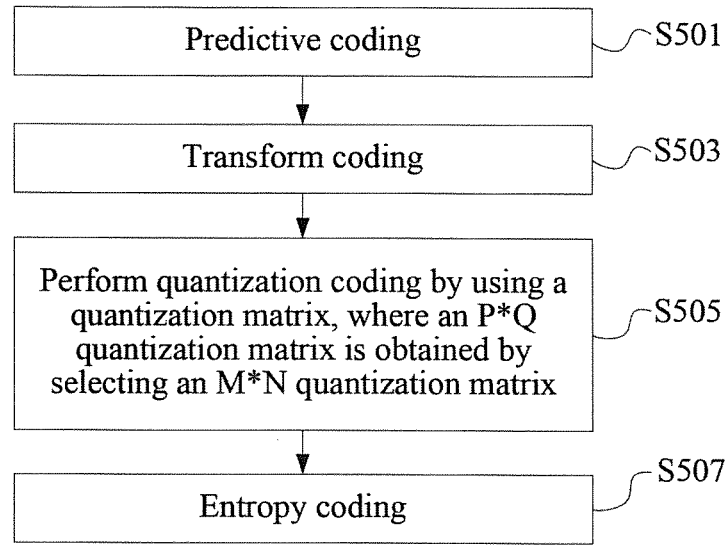
FIG. 5 is a flowchart of an image coding method according to still another embodiment of the present invention.

The present invention provides an image coding method. Referring to FIG. 5, FIG. 5 is a flowchart of this method according to an embodiment. The coding method includes:

S501: Perform predictive coding on an image.

S503: Perform transform coding on the image on which the predictive coding has been performed.

S505: Perform, by using a quantization matrix, quantization coding on the image on which the transform coding has been performed, where the quantization matrix is a matrix reflecting image quantization step information, the quantization matrix includes an M*N quantization matrix and a P*Q quantization matrix, and the P*Q quantization matrix is obtained by selecting the M*N quantization matrix.

S507: Perform entropy coding on the image on which the quantization coding has been performed, and code the M*N quantization matrix, so as to generate a code stream.

In the embodiment of the present invention, M is not equal to N, and P is not equal to Q.

In an embodiment of the present invention, S505: the P*Q quantization matrix is obtained by selecting the M*N quantization matrix, which includes: the P*Q quantization matrix is a selected matrix of the M*N quantization matrix.

In an embodiment of the present invention, S505: the P*Q quantization matrix is obtained by selecting the M*N quantization matrix, which includes: the P*Q quantization matrix is obtained by selecting and predicting the M*N quantization matrix; and S507: code the M*N quantization matrix, which includes: obtaining a P*Q differential quantization matrix through calculation according to a difference between the P*Q quantization matrix and the selected matrix of the M*N quantization matrix, and coding the M*N quantization matrix and the P*Q differential quantization matrix.

Figure 6:
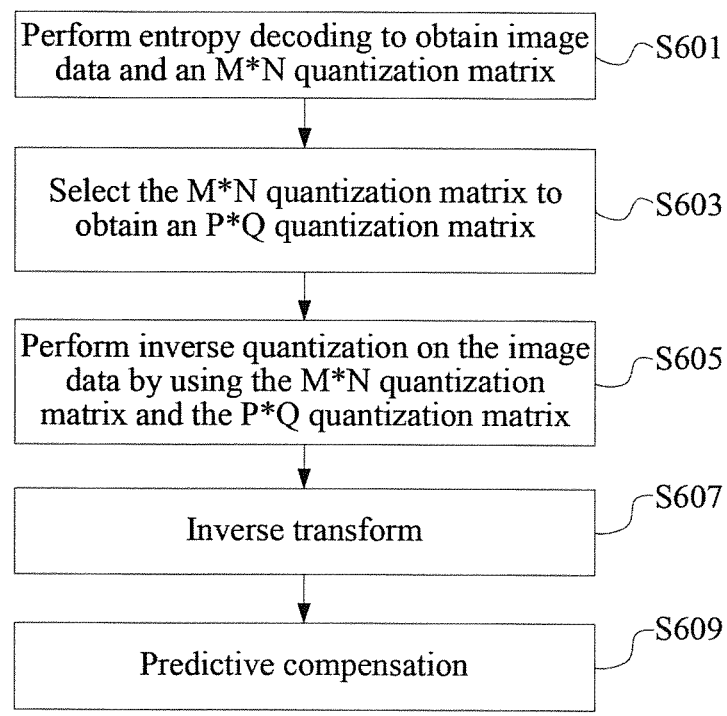
FIG. 6 is a flowchart of an image decoding method according to still another embodiment of the present invention.

The present invention provides an image decoding method. Referring to FIG. 6, FIG. 6 is a flowchart of this method according to an embodiment. The decoding method includes:

S601: Perform entropy decoding on a received code stream to obtain image data and a quantization matrix, where the quantization matrix is a matrix reflecting image quantization step information, and the quantization matrix includes an M*N quantization matrix.

S603: Obtain a P*Q quantization matrix by selecting the M*N quantization matrix.

S605: Perform, by using the M*N quantization matrix and the P*Q quantization matrix, inverse quantization on the image data on which the entropy decoding has been performed.

S607: Perform inverse transform on the image data on which the inverse quantization has been performed.

S609: Perform predictive compensation on the image data on which the inverse transform has been performed, so as to generate a decoded image.

In the embodiment of the present invention, M is not equal to N, and P is not equal to Q.

In an embodiment of the present invention, S603: obtain a P*Q quantization matrix by selecting the M*N quantization matrix, which includes that: the P*Q quantization matrix is a selected matrix of the M*N quantization matrix.

In another embodiment of the present invention, S601: perform entropy decoding on a received code stream to obtain image data and a quantization matrix, which includes: performing the entropy decoding on the received code stream to obtain the image data, the quantization matrix, and an M*N differential quantization matrix; and S603: obtain a P*Q quantization matrix by selecting the M*N quantization matrix, which includes: obtaining the P*Q quantization matrix by using a sum of a selected matrix of the M*N quantization matrix and the M*N differential quantization matrix.

Figure 7:
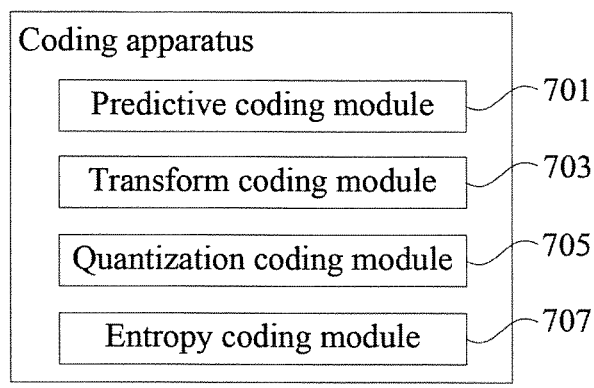
FIG. 7 is a structural diagram of an image coding apparatus according to an embodiment of the present invention.

An embodiment of the present invention provides an image coding apparatus. Referring to FIG. 7, FIG. 7 is a structural diagram of this apparatus according to an embodiment. The image coding apparatus includes: a predictive coding module 701, configured to perform predictive coding on an image; a transform coding module 703, configured to perform transform coding on the image on which the predictive coding has been performed; a quantization coding module 705, configured to perform, by using a quantization matrix, quantization coding on the image on which the transform coding has been performed, where the quantization matrix is a matrix reflecting image quantization step information, the quantization matrix includes an M*N quantization matrix and an N*M quantization matrix, and the N*M quantization matrix is obtained by transposing the M*N quantization matrix; and an entropy coding module 707, configured to perform entropy coding on the image on which the quantization coding has been performed, and code the M*N quantization matrix, so as to generate a code stream.

The quantization coding module 703 is configured to perform, by using the quantization matrix including the M*N quantization matrix and the N*M quantization matrix, the quantization coding on the image on which the transform coding has been performed, where the N*M quantization matrix is obtained by transposing the M*N quantization matrix.

The quantization coding module 703 is configured to perform, by using the quantization matrix including the M*N quantization matrix and the N*M quantization matrix, the quantization coding on the image on which the transform coding has been performed, where the N*M quantization matrix is obtained by transposing and predicting the M*N quantization matrix; and the entropy coding module 707 is configured to obtain an N*M differential quantization matrix through calculation according to a difference between the N*M quantization matrix and a transposed matrix of the M*N quantization matrix, and code the M*N quantization matrix and the N*M differential quantization matrix.

Figure 8:
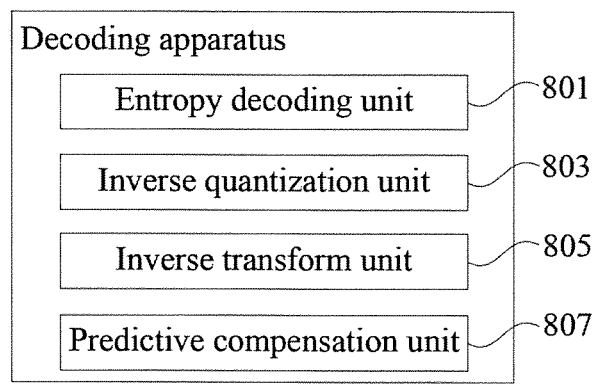
FIG. 8 is a structural diagram of an image decoding apparatus according to an embodiment of the present invention.

An embodiment of the present invention provides an image decoding apparatus. Referring to FIG. 8, FIG. 8 is a structural diagram of this apparatus according to an embodiment. The image decoding apparatus includes: an entropy decoding unit 801, configured to perform entropy decoding on a received code stream to obtain image data and a quantization matrix, where the quantization matrix is a matrix reflecting image quantization step information, and the quantization matrix includes an M*N quantization matrix; an inverse quantization unit 803, configured to obtain an N*M quantization matrix by transposing the M*N quantization matrix, and perform, by using the M*N quantization matrix and the N*M quantization matrix, inverse quantization on the image data on which the entropy decoding has been performed; an inverse transform unit 805, configured to perform inverse transform on the image data on which the inverse quantization has been performed; and a predictive compensation unit 807, configured to perform predictive compensation on the image data on which the inverse transform has been performed, so as to generate a decoded image.

The inverse quantization unit 803 is configured to assign a transposed matrix of the M*N quantization matrix to the N*M quantization matrix.

The entropy decoding unit 801 is configured to perform the entropy decoding on the received code stream to obtain the image data, the quantization matrix, and an M*N differential quantization matrix; and the inverse quantization unit is configured to obtain the N*M quantization matrix by using a sum of the transposed matrix of the M*N quantization matrix and the N*M differential quantization matrix.

An embodiment of the present invention provides an image coding apparatus, where the apparatus includes: a predictive coding module, configured to perform predictive coding on an image; a transform coding module, configured to perform transform coding on the image on which the predictive coding has been performed; a quantization coding module, configured to perform, by using a quantization matrix, quantization coding on the image on which the transform coding has been performed, where the quantization matrix is a matrix reflecting image quantization step information, the quantization matrix includes an M*N quantization matrix and a P*Q quantization matrix, and the P*Q quantization matrix is obtained by scaling the M*N quantization matrix; and an entropy coding module, configured to perform entropy coding on the image on which the quantization coding has been performed, and code the M*N quantization matrix, so as to generate a code stream.

The quantization coding module is configured to perform, by using the quantization matrix including the M*N quantization matrix and the P*Q quantization matrix, the quantization coding on the image on which the transform coding has been performed, where the P*Q quantization matrix is a scaled matrix of the M*N quantization matrix.

The quantization coding module is configured to perform, by using the quantization matrix including the M*N quantization matrix and the P*Q quantization matrix, the quantization coding on the image on which the transform coding has been performed, where the P*Q quantization matrix is obtained by predicting the scaled matrix of the M*N quantization matrix; and the entropy coding module is configured to obtain a P*Q differential quantization matrix through calculation according to a difference between the P*Q quantization matrix and the scaled matrix of the M*N quantization matrix, and code the M*N quantization matrix and the P*Q differential quantization matrix.

An embodiment of the present invention provides an image decoding apparatus, where the decoding apparatus includes: an entropy decoding unit, configured to perform entropy decoding on a received code stream to obtain image data and a quantization matrix, where the quantization matrix is a matrix reflecting image quantization step information, and the quantization matrix includes an M*N quantization matrix; an inverse quantization unit, configured to obtain a P*Q quantization matrix by scaling the M*N quantization matrix, and perform, by using the M*N quantization matrix and the P*Q quantization matrix, inverse quantization on the image data on which the entropy decoding has been performed; an inverse transform unit, configured to perform inverse transform on the image data on which the inverse quantization has been performed; and a predictive compensation unit, configured to perform predictive compensation on the image data on which the inverse transform has been performed, so as to generate a decoded image.

The inverse quantization unit is configured to assign a scaled matrix of the M*N quantization matrix to the P*Q quantization matrix.

The entropy decoding unit is configured to perform the entropy decoding on the received code stream to obtain the image data, the quantization matrix, and an M*N differential quantization matrix; and the inverse quantization unit is configured to obtain the P*Q quantization matrix by using a sum of the scaled matrix of the M*N quantization matrix and the M*N differential quantization matrix.

An embodiment of the present invention provides an image coding apparatus, where the coding apparatus includes: a predictive coding module, configured to perform predictive coding on an image; a transform coding module, configured to perform transform coding on the image on which the predictive coding has been performed; a quantization coding module, configured to perform, by using a quantization matrix, quantization coding on the image on which the transform coding has been performed, where the quantization matrix is a matrix reflecting image quantization step information, the quantization matrix includes an M*N quantization matrix and a P*Q quantization matrix, and the P*Q quantization matrix is obtained by selecting the M*N quantization matrix; and an entropy coding module, configured to perform entropy coding on the image on which the quantization coding has been performed, and code the M*N quantization matrix, so as to generate a code stream.

The quantization coding module is configured to perform, by using the quantization matrix including the M*N quantization matrix and the P*Q quantization matrix, the quantization coding on the image on which the transform coding has been performed, where the P*Q quantization matrix is a selected matrix of the M*N quantization matrix.

The quantization coding module is configured to perform, by using the quantization matrix including the M*N quantization matrix and the P*Q quantization matrix, the quantization coding on the image on which the transform coding has been performed, where the P*Q quantization matrix is obtained by selecting and predicting the M*N quantization matrix; and the entropy coding module is configured to obtain a P*Q differential quantization matrix through calculation according to a difference between the P*Q quantization matrix and the selected matrix of the M*N quantization matrix, and code the M*N quantization matrix and the P*Q differential quantization matrix.

An embodiment of the present invention provides an image decoding apparatus, where the decoding apparatus includes: an entropy decoding unit, configured to perform entropy decoding on a received code stream to obtain image data and a quantization matrix, where the quantization matrix is a matrix reflecting image quantization step information, and the quantization matrix includes an M*N quantization matrix; an inverse quantization unit, configured to obtain a P*Q quantization matrix by selecting the M*N quantization matrix, and perform, by using the M*N quantization matrix and the P*Q quantization matrix, inverse quantization on the image data on which the entropy decoding has been performed; an inverse transform unit, configured to perform inverse transform on the image data on which the inverse quantization has been performed; and a predictive compensation unit, configured to perform predictive compensation on the image data on which the inverse transform has been performed, so as to generate a decoded image.

The inverse quantization unit is configured to assign a selected matrix of the M*N quantization matrix to the P*Q quantization matrix.

The entropy decoding unit is configured to perform entropy decoding on the received code stream to obtain the image data, the quantization matrix, and an M*N differential quantization matrix; and the obtaining a P*Q quantization matrix by selecting the M*N quantization matrix includes that: the inverse quantization unit is configured to obtain the P*Q quantization matrix by using a sum of the selected matrix of the M*N quantization matrix and the M*N differential quantization matrix.

Finally, it should be noted that the foregoing embodiments are merely provided for describing the technical solutions of the present invention, but are not intended to limit the present invention. It should be understood by a person of ordinary skill in the art that although the present invention has been described in detail with reference to the foregoing embodiments, modifications can still be made to the technical solutions described in the foregoing embodiments, or equivalent replacements can be made to some technical features in the technical solutions, as long as such modifications or replacements do not make the essence of corresponding technical solutions depart from the spirit and scope of the technical solutions in the embodiments of the present invention.

What is claimed is:

1. An image coding method, comprising:
performing predictive coding on an image;
performing transform coding on the image on which the predictive coding has been performed;
performing, using a quantization matrix, quantization coding on the image on which the transform coding has been performed, wherein the quantization matrix is a matrix reflecting image quantization step information, the quantization matrix comprises an M*N quantization matrix and an N*M quantization matrix, and the N*M quantization matrix is obtained by transposing and predicting the M*N quantization matrix, and wherein M is not equal to N; and
performing entropy coding on the image on which the quantization coding has been performed, and coding the M*N quantization matrix, so as to generate a code stream, wherein coding the M*N quantization matrix comprises obtaining an N*M differential quantization matrix through calculation according to a difference between the N*M quantization matrix and a transposed matrix of the M*N quantization matrix, and performing the entropy coding on the M*N quantization matrix and the N*M differential quantization matrix,
wherein performing the entropy coding on the image on which the quantization coding has been performed comprises performing differential pulse code modulation (DPCM) prediction on the image.

2. An image decoding method, comprising:
performing entropy decoding on a received code stream to obtain image data and a quantization matrix, wherein the quantization matrix is a matrix reflecting image quantization step information, and the quantization matrix comprises an M*N quantization matrix;
obtaining an N*M quantization matrix by transposing and predicting the M*N quantization matrix, wherein M is not equal to N;
performing, using the M*N quantization matrix and the N*M quantization matrix, inverse quantization on the image data;
performing inverse transform on the image data on which the inverse quantization has been performed; and performing predictive compensation on the image data on which the inverse transform has been performed, so as to generate a decoded image, wherein:

performing entropy decoding on a received code stream to obtain image data and a quantization matrix comprises:

performing the entropy decoding and differential pulse code modulation (DPCM) predictive compensation on the received code stream to obtain the image data, the quantization matrix, and an M*N differential quantization matrix; and obtaining an N*M quantization matrix by transposing and predicting the M*N quantization matrix comprises:

obtaining the N*M quantization matrix by using a sum of a transposed matrix of the M*N quantization matrix and the N*M differential quantization matrix.

* * * * *